US012623946B2

(12) United States Patent
Tratzky et al.

(10) Patent No.: US 12,623,946 B2
(45) Date of Patent: May 12, 2026

(54) DEVICE FOR PRODUCING GLASS TUBES BY A VELLO OR DOWN-DRAW METHOD, METHOD FOR PRODUCING GLASS TUBES BY A VELLO OR DOWN-DRAW METHOD AND GLASS TUBES

(71) Applicant: Schott AG, Mainz (DE)

(72) Inventors: Stephan Tratzky, Neustadt/Wn (DE);
Volker Trinks, Mitterteich (DE);
Jürgen Eckl, Vohenstrauss (DE);
Thomas Männer, Mitterteich (DE);
Thomas Zimmert, Tirschenreuth (DE)

(73) Assignee: Schott AG, Mainz (DE)

( * ) Notice: Subject to any disclaimer, the term of this patent is extended or adjusted under 35 U.S.C. 154(b) by 192 days.

(21) Appl. No.: 18/315,673

(22) Filed: May 11, 2023

(65) Prior Publication Data

US 2023/0365452 A1      Nov. 16, 2023

(30) Foreign Application Priority Data

May 12, 2022    (EP) ..................................... 22173006

(51) Int. Cl.
*C03B 17/04*          (2006.01)
(52) U.S. Cl.
CPC .................................... *C03B 17/04* (2013.01)
(58) Field of Classification Search
CPC .................................. C03B 17/04; C03C 3/083
See application file for complete search history.

(56) References Cited

U.S. PATENT DOCUMENTS

| 8,434,329 | B2 | 5/2013 | Singer | |
| 2021/0309555 | A1* | 10/2021 | Trinks | ................... C03C 21/002 |
| 2021/0403362 | A1* | 12/2021 | Witzmann | ................ A61J 1/05 |

FOREIGN PATENT DOCUMENTS

| CN | 201071335 Y | 6/2008 |
| CN | 102320720 A | 1/2012 |
| CN | 202214285 U | 5/2012 |
| CN | 208166834 U | 11/2018 |

OTHER PUBLICATIONS

European Office Action dated Jan. 9, 2023 for European Patent Application No. 22 173 006.2 (6 pages).
"Glass—Viscosity and viscometric fixed points—Part 2: Determination of viscosity by rotation viscometers", DIN ISO 7884-2:1998-2, Dec. 15, 1987 (12 pages).
"Glass Tube of Various Diameter and Thickness", YUANBO Engineering Co., Ltd, Publication No. XP093314992 (3 pages).

* cited by examiner

*Primary Examiner* — Michael C Miggins
(74) *Attorney, Agent, or Firm* — TAYLOR & EDELSTEIN, PC

(57) ABSTRACT

A glass tube has a center axis, where for the glass tube a specific cross-sectional plane is defined which includes the center axis and which is parallel to the center axis. Within the specific cross-sectional plane, for each pair of outer diameters d1 and d2 of the glass tube at any two arbitrarily selected first axial position x1 and second axial positions x2 along the center axis, respectively, the following relation is 60 or smaller: $|(d2-d1)/(x2-x1)|*(10^6 \text{ mm})/d1$.

20 Claims, 3 Drawing Sheets

1

DEVICE FOR PRODUCING GLASS TUBES BY A VELLO OR DOWN-DRAW METHOD, METHOD FOR PRODUCING GLASS TUBES BY A VELLO OR DOWN-DRAW METHOD AND GLASS TUBES

CROSS REFERENCE TO RELATED APPLICATIONS

This application claims priority to European Patent Application No. EP 22173006.2 filed on May 12, 2022, which is incorporated in its entirety herein by reference.

BACKGROUND OF THE INVENTION

1. Field of the Invention

The present invention relates to a device for producing glass tubes by a Vello or down-draw method, to a method for producing glass tubes by a Vello or down-draw process and to glass tubes.

2. Description of the Related Art

Glass tubes with large outer diameters are generally drawn using the Vello or down-draw method. In this process, a molten glass flows over a shaping body comprised by a shaping mandrel. The glass drawing strand forming at the break-off edge of the shaping body is drawn downwards by a drawing machine and cools during the process. Once the glass drawing strand has reached a predefined length, a tube section of predefined length can be cut off from the glass drawing strand and fed to horizontal end processing. Due to the vertical orientation of the drawing process, in addition to the forces exerted by the drawing rollers of the drawing machine, the dead weight of the glass drawing strand also acts on the strand and tube forming process, which varies continuously due to the cutting off of individual sections at the end of the glass drawing strand.

The variation of the glass drawing strand weight in this way continuously influences the outside diameter and wall thickness of the glass drawing strand when it is formed in the area of the break-off edge of the shaping body. In the case of the Vello or down-draw method, this leads to an oscillating course of the outside diameter along the tube axis. The length of an "outer diameter oscillation" can correspond to the length of a tube section. The amplitude of the "outer diameter oscillation" is a measure of the geometric quality of a produced glass tube. Therefore, there is a general desire to further reduce the amplitude of the "outer diameter oscillation" and thus the outer diameter variation as a whole.

What is needed in the art is ways which allow producing glass tubes having large outer diameters of highly uniform outer diameter and to provide glass tubes of high quality.

SUMMARY OF THE INVENTION

In some exemplary embodiments provided according to the invention, a glass tube has a center axis, where for the glass tube a specific cross-sectional plane is defined which includes the center axis and which is parallel to the center axis. Within the specific cross-sectional plane, for each pair of outer diameters d1 and d2 of the glass tube at any two arbitrarily selected first axial position x1 and second axial positions x2 along the center axis, respectively, the following relation is 60 or smaller: $|(d2-d1)/(x2-x1)|*(10^6 \text{ mm})/d1$.

2

In some exemplary embodiments provided according to the invention, a glass tube has a center axis, where for the glass tube a specific cross-sectional plane is defined which comprises the center axis and which is parallel to the center axis. Within the specific cross-sectional plane, for each pair of outer diameters d1 and d2 of the glass tube at any two arbitrarily selected axial positions x1 and x2 along the center axis, at least one of the following is satisfied: (i) a relative change of the outer diameter, $|(d2-d1)/d2|$, with d2>d1, is 0.035 or less; or (ii) a ratio d1/d2, with d2≥d1, is 0.95 or greater.

In some exemplary embodiments provided according to the invention, a method for producing glass tubes by a Vello or down-draw process includes: flowing a glass melt from a melt feeder, through an outlet opening of the melt feeder and over a shaping body thereby forming a hollow glass drawing strand. The shaping body has a first part extending from a lower end of a shaft in axial direction along a length X and having a conical outer surface, and a second part extending from a lower end of the first part in axial direction along a length Y and having a cylindrical outer surface with an outer diameter Z. A ratio X/Z is between 0.1 and 0.5 and a ratio Y/Z is between 0.02 and 0.35.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
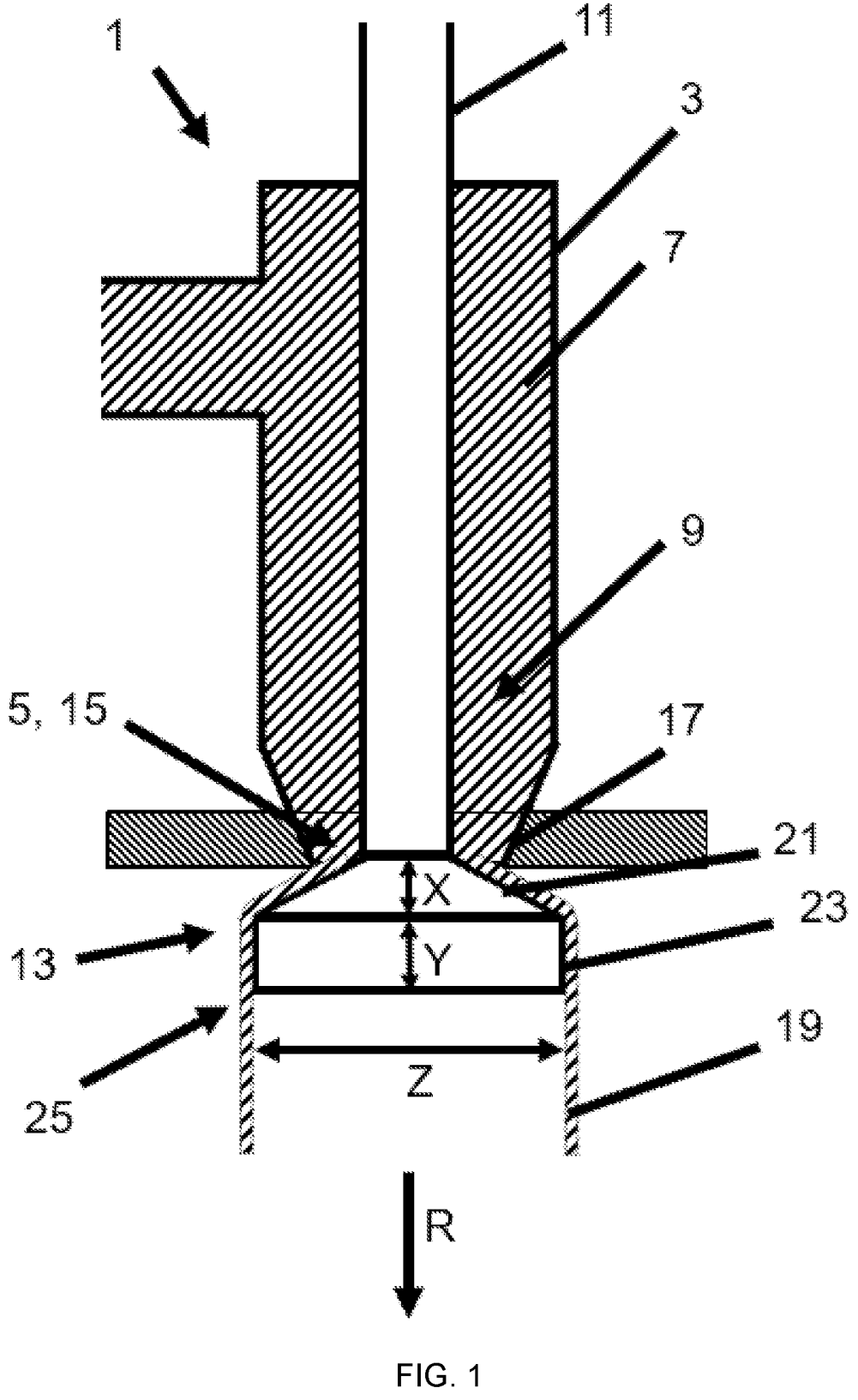
FIG. 1 illustrates a schematic cross-sectional view of an exemplary embodiment of a device provided according to the invention.

In some embodiments provided according to the invention, a device for producing glass tubes by a Vello or down-draw method includes a melt feeder with an outlet opening for discharging a glass melt, and a shaping mandrel having a shaft and a shaping body. The shaft extends through the outlet opening forming an outlet ring between the shaft and a circumferential edge of the outlet opening, so that the glass melt can flow from the melt feeder through the outlet ring and over the shaping body thereby forming a hollow glass drawing strand. The shaping body has a first part extending from a lower end of the shaft in axial direction along a length X and having a conical outer surface, and a second part extending from a lower end of the first part in axial direction along a length Y and having a cylindrical outer surface with an outer diameter Z. The ratio X/Z is between 0.1 and 0.5 and the ratio Y/Z is between 0.02 and 0.35.

Some embodiments provided according to the invention are thus based on the surprising finding that by providing a shaping body with respective optimized dimensions of a conical and a cylindrical section, a "smoothing" of the glass flow can be achieved with the result of a more uniform formation of the glass layer on the cylindrical section. As a consequence, also the glass mass in the drawn glass drawing strand is more evenly distributed and the oscillation of the outer diameter in the axial direction of the glass drawing strand is highly reduced. Hence, glass tubes with a more uniform outer diameter can be obtained even for glass tubes of large outer diameters, such as outer diameters of more than 90 mm.

While not bound to any theory, it is assumed that the proposed dimensions lead to a more homogeneous temperature distribution in the flowing glass on the shaping body and thus improves a uniform formation of the glass layer on the cylindrical section.

This theory is supported by the observations that if the height-to-diameter ratio of the conical section is too high (i.e. the outer surface of the conical section along which the molten glass flows is too steep), the required cooling capacities or glass layer thicknesses can no longer be achieved on the surface of the shaping body to achieve certain outer diameter and/or wall thicknesses of the produced glass tubes.

If the height-to-diameter ratio of the conical part is, however, too low (i.e. the outer surface of the conical section along which the molten glass flows is too flat), the heat radiation from the glass layer increases, thus its temperature decreases further and the associated viscosity increases. This leads to a slower flow of the glass material on the following cylinder surface and causes an inhomogeneous distribution of the glass mass on the now very flat, plate-shaped area of the shaping body. In this case, the glass mass therefore flows inhomogeneously onto the cylindrical section of the shaping body which leads to an inhomogeneous glass mass distribution on the cylinder surface.

Since the cylindrical section is where the tube is "guided" before it is drawn off, this section has been identified as therefore having together with the conical section an important role in stabilizing the glass flow.

Hence, in that the shaping body is provided in line with the disclosed design, this will consequently have a positive effect on the stability of the overall glass flow. Hence, less "waves" are introduced in the glass layer and so the oscillations of the outside diameter of the glass drawing strand and the produced glass tube as well are reduced in their amplitude.

In some embodiments, the ratio X/Z is between 0.1 and 0.3 or between 0.2 and 0.5.

In some embodiments, the ratio X/Z is 0.15 or more, optionally 0.2 or more, optionally 0.25 or more, optionally 0.3 or more, optionally 0.35 or more.

In some embodiments, the ratio X/Z is 0.45 or less, optionally 0.4 or less, optionally 0.35 or less, optionally 0.3 or less, optionally 0.25 or less, optionally 0.2 or less, optionally 0.15 or less.

In some embodiments, the ratio Y/Z is between 0.02 and 0.2 or between 0.15 and 0.35.

In some embodiments, the ratio Y/Z is 0.03 or more, optionally 0.05 or more, optionally 0.1 or more, optionally 0.15 or more, optionally 0.2 or more, optionally 0.25 or more, optionally 0.3 or more.

In some embodiments, the ratio Y/Z is 0.3 or less, optionally 0.25 or less, optionally 0.2 or less, optionally 0.15 or less, optionally 0.1 or less, optionally 0.05 or less.

The outer diameter Z may be 90 mm or more, optionally 100 mm or more, optionally 120 mm or more, optionally 150 mm or more, optionally 200 mm or more, optionally 220 mm or more, optionally 250 mm or more, optionally 300 mm or more, optionally 320 mm or more, optionally 350 mm or more, optionally 400 mm or more, optionally 420 mm or more, optionally 450 mm or more, and/or 1000 mm or less, optionally 700 mm or less, optionally 500 mm or less, optionally 400 mm or less, optionally 300 mm or less, optionally 200 mm or less, optionally 100 mm or less.

Optionally, the device is designed such that the glass melt can flow from the melt feeder through the outlet ring and over the shaping body along a main drawing direction. The main drawing direction may also be the direction along which the glass strand is drawn by a drawing machine off the shaping body. The main drawing direction may be parallel to a vertical direction and/or to a direction parallel to gravity, respectively, when the device is in use.

Optionally, the conical outer surface is conically extending in the drawing direction.

Since the general principles of the Vello and down-draw method are known in the art, they do not need to be described here in further detail. It is especially known that during the production process within which the disclosed device may be used, the molten glass flows from the melt feeder out of the outlet opening. The shaping mandrel extends within the outlet opening, forming the outlet ring. Advantageously, the shaping mandrel may have a plurality of portions: an upper portion, the shaft, a central conical portion, the first part, and a lower cylindrical portion, the second part. The diameter of the lower edge of the conical area of the shaping mandrel optionally has a larger diameter than the inner diameter of the outlet opening, so that the surface of the conical area of the first part and the cylindrical area of the second part are located below the outlet ring. The molten glass then may flow out of the melt feeder in a vertical direction (and/or along the main drawing direction) through the outlet ring between an edge of the outlet opening and the shaft, and continues to flow radially outward as a glass layer on the surface of the conical area of the first part and over the circumferential surface of the cylindrical area of the second part to its lower end (the "break-off edge").

In some embodiments, the first part and the second part are in direct succession in axial direction, have a common central axis, are hollow and/or are made in one piece, the maximum outer diameter of the first part is equal to the outer diameter of the second part, the outer diameter Z is 80 mm or more, and/or the shaping mandrel is axially adjustable and/or rotationally stationary.

If the first and second parts are hollow, the glass strand drawn off from the shaping body can be further stabilized in that process air is blown through the shaping mandrel or parts thereof which leaves the shaping mandrel at the end of the cylindrical section of the second part. Of course, the shaft of the shaping mandrel may be hollow as well.

If the first and second part are made in one piece, a robust shaping body can be provided. Furthermore, the transition between the conical and the cylindrical section can thus be designed in a smooth manner. Also, the fabrication costs can be reduced.

Optionally, the shaping mandrel, especially the shaping body, is at a fixed position relative to the melt feeder and/or is rotationally fixed.

In some embodiments provided according to the invention, a method for producing glass tubes by a Vello or down-draw process is provided, in which process a glass melt flows from a melt feeder, through an outlet opening of the melt feeder and over a shaping body thereby forming a hollow glass drawing strand. The shaping body has a first part extending from a lower end of the shaft in axial direction along a length X and having a conical outer surface, and a second part extending from a lower end of the first part in axial direction along a length Y and having a cylindrical outer surface with an outer diameter Z. The ratio X/Z is between 0.1 and 0.5 and the ratio Y/Z is between 0.02 and 0.35.

The explanations provided previously with respect to the device provided according to the invention apply here accordingly, unless the context indicates otherwise. Therefore, they need not be repeated here, but reference can be made to the previous explanations.

The shaping body may be comprised by a shaping mandrel. The shaping mandrel may also have a shaft. Optionally, the shaping mandrel is at a fixed position relative to the melt feeder and/or is rotationally fixed.

In some embodiments, the method may comprise: Providing a device according to the invention; and/or Cutting off a tube section of predefined length from the glass drawing strand, especially once the glass drawing strand has reached a predefined length. This tube section may be further cooled and/or be regarded as a glass tube provided according to the invention.

Since the general principles of the Vello or down-draw method are known in the art, they do not need to be described here in further detail. It is especially known that optionally by changing the surface area of the conical section (of the first part) the dwell time of the glass material on the shaping body can be adjusted. This may also lead to variation of the radiation losses of the glass material on the shaping body, so that the temperature of the glass material increases/decreases and/or its viscosity decreases/increases. This may lead to an adapted glass material thickness on the shaping body, which in turn allows to adapt the outer diameter and/or wall thickness of the glass drawn strand and thus for the produced glass tubes. Optionally, with an increasing cooling capacity of the shaping body, glass tubes with larger outer diameter and/or wall thickness dimensions may be produced and/or the draw-off capacity can be increased.

Optionally the glass melt flows from the melt feeder through the outlet opening of the melt feeder and over the shaping body along a main drawing direction. The main drawing direction may also be the direction along which the glass strand is drawn by a drawing machine off the shaping body. The main drawing direction may be parallel to a vertical direction and/or to a direction parallel to gravity, respectively, during producing the glass tubes.

In some embodiments, the first part and the second part are in direct succession in axial direction, have a common central axis, are hollow and/or are made in one piece, the maximum outer diameter of the first part is equal to the outer diameter of the second part, and/or the outer diameter Z is 80 mm or more.

If the first and second parts are hollow, the glass strand drawn off from the shaping body can be further stabilized in that process air is blown through the shaping mandrel or parts thereof which leaves the shaping mandrel at the end of the cylindrical section of the second part. Of course, the shaft of the shaping mandrel may be hollow as well.

If the first and second part are made in one piece, a robust shaping body can be provided. Furthermore, the transition between the conical and the cylindrical section can thus be designed in a smooth manner. Also, the fabrication costs can be reduced.

The outer diameter Z may be 90 mm or more, optionally 100 mm or more, optionally 120 mm or more, optionally 150 mm or more, optionally 200 mm or more, optionally 220 mm or more, optionally 250 mm or more, optionally 300 mm or more, optionally 320 mm or more, optionally 350 mm or more, optionally 400 mm or more, optionally 420 mm or more, optionally 450 mm or more, and/or 1000 mm or less, optionally 700 mm or less, optionally 500 mm or less, optionally 400 mm or less, optionally 300 mm or less, optionally 200 mm or less, optionally 100 mm or less.

In some embodiments provided according to the invention, a glass tube has a center axis, wherein for the glass tube a specific cross-sectional plane can be defined which comprises the center axis and which is parallel to the center axis. Within the specific cross-sectional plane, for each pair of outer diameters d1 and d2 of the glass tube at any two arbitrarily selected first and second axial positions x1 and x2 along the center axis, the following relation is 60 or smaller:

$$|(d2-d1)/(x2-x1)|*(10\textasciicircum6mm)/d1.$$

Exemplary embodiments provided according to the invention are thus based on the surprising finding that with the device provided according to the invention and/or with the method provided according to the invention it is possible for the first time to produce a glass tube having a geometric quality which fulfils the strong requirements set forth by the disclosed relation.

In other words, the disclosed glass tube has a highly uniform outer diameter, i.e. the amplitude of the outer diameter's oscillation is optionally highly reduced.

In some embodiments, the relation is 0.1 or more, optionally 0.5 or more, optionally 1 or more, optionally 5 or more, optionally 10 or more, optionally 15 or more, optionally 20 or more, optionally 25 or more, optionally 30 or more, optionally 35 or more, optionally 40 or more, optionally 45 or more, optionally 50 or more, optionally 55 or more.

For example, the relation is between 0.1 and 60, optionally between 0.1 and 40, such as between 0.1 and 30 or between 20 and 40, or between 20 and 60, such as between 20 and 40 or between 30 and 60.

The values of d1, d2, x1 and x2 are optionally all provided in Millimeters.

Optionally, the term "glass tube" as used herein refers to a hollow glass body. The glass tube typically has a wall surrounding a lumen and two open ends.

Optionally, the term "outer diameter" as used herein refers to the maximum distance between two points on the outer surface of the glass tube and within the specific cross-sectional plane, wherein the two points are connected by a straight line, which is perpendicular to and intersects with the center axis of the glass tube. The glass tube may have more than one outer diameter.

Optionally, the term "inner diameter" as used herein refers to the maximum distance between two points on the inner surface of the glass tube and within the specific cross-sectional plane, wherein the two points are connected by a straight line, which is perpendicular to and intersects with the center axis of the glass tube. The glass tube may have more than one inner diameter.

Optionally, the term "wall thickness" as used herein describes the shortest distance between the inner and outer surface of the glass tube. The glass tube may have more than one wall thickness.

In some embodiments, the relation is 50 or smaller, optionally 40 or smaller, optionally 30 or smaller, optionally 20 or smaller, the relation multiplied with the length of the tube is 90000 or smaller, optionally 750000 or smaller, optionally 500000 or smaller, optionally 300000 or smaller, and/or the relation multiplied with the length and the diameter d1, respectively, of the tube is 40000000 or smaller, optionally 30000000 or smaller, optionally 20000000 or smaller, optionally 10000000 or smaller.

In some embodiments, the relation is 35 or smaller, optionally 30 or smaller, optionally 25 or smaller, optionally 20 or smaller, optionally 15 or smaller, optionally 10 or smaller, optionally 5 or smaller, optionally 3 or smaller, optionally 1 or smaller.

In some exemplary embodiments provided according to the invention, a glass tube has a center axis, wherein for the glass tube a specific cross-sectional plane can be defined which comprises the center axis and which is parallel to the center axis. Within the specific cross-sectional plane, for each pair of outer diameters d1 and d2 of the glass tube at any two arbitrarily selected axial positions x1 and x2 along the center axis, (i) the relative change of the outer diameter, $$\left| \frac{d2 - d1}{d2} \right|,$$

especially with d2>d1, is 0.035 or less, optionally 0.03 or less, optionally 0.025 or less, optionally 0.02, optionally 0.015, optionally 0.01, and/or (ii) the ratio d1/d2, with d2≥d1, is 0.95 or greater, optionally 0.96 or greater, optionally 0.97 or greater, optionally 0.98 or greater, optionally 0.99 or greater.

Exemplary embodiments provided according to the invention are thus based on the surprising finding that with the device provided according to the invention and/or with the method provided according to the invention it is possible for the first time to produce a glass tube having a geometric quality which fulfils the strong requirements set forth by the disclosed relation.

In other words, the disclosed glass tube has a highly uniform outer diameter, i.e. the amplitude of the outer diameter's oscillation is optionally highly reduced.

In some embodiments, the relative change of the outer diameter is 0.027 or less, optionally 0.025 or less, optionally 0.023 or less, optionally 0.02 or less, optionally 0.017 or less, optionally 0.015 or less, optionally 0.013 or less, optionally 0.01 or less, optionally 0.007 or less, optionally 0.005 or less, optionally 0.003 or less.

In some embodiments, the relative change of the outer diameter is 0.001 or more, optionally 0.005 or more, optionally 0.01 or more, optionally 0.015 or more, optionally 0.02 or more, optionally 0.025 or more, optionally 0.03 or more.

In some embodiments, the ratio d1/d2 is 0.967 or greater, optionally 0.97 or greater, optionally 0.973 or greater, optionally 0.975 or greater, optionally 0.977 or greater, optionally 0.98 or greater, optionally 0.983 or greater, optionally 0.985 or greater, optionally 0.987 or greater, optionally 0.99 or greater, optionally 0.993 or greater, optionally 0.995 or greater, optionally 0.997 or greater.

In some embodiments, the ratio d1/d2 is 0.9999 or less, optionally 0.999 or less, optionally 0.99 or less, optionally 0.985 or less, optionally 0.98 or less, optionally 0.975 or less, optionally 0.97 or less, The values of d1 and d2 are optionally all provided in Millimeters.

In some embodiments: (i) the relative change of the outer diameter multiplied with the length of the tube is 50 or less, optionally 40 or less, optionally 30 or less, optionally 20 or less, optionally 10 or less, optionally 5 or less; (ii) the ratio d1/d2 multiplied with the length of the tube is 1400 or greater, optionally 1450 or greater, optionally 1500 or greater, optionally 1550 or greater; (iii) the relative change of the outer diameter multiplied with the length and the diameter d1, respectively, of the tube is 14000 or less, optionally 11000 or less, optionally 8000 or less, optionally 6000 or less, optionally 4000 or less; and/or (iv) the ratio d1/d2 multiplied with the length and the diameter d1, respectively, of the tube is 800000 or greater, optionally 700000 or greater, optionally 650000 or greater, optionally 600000 or greater.

Said relationships turned out being advantageous for glass tubes with highly uniform outer diameter.

In some embodiments, the distance between x1 and x2 along the center axis is (i) half of the total length of the glass tube or less or (ii) 400 mm or more, optionally 500 mm or more, optionally 600 mm or more, optionally 700 mm or more, optionally 800 mm or more, optionally 1000 mm or more, optionally 1200 mm or more.

The distance may also be 1500 mm or more, optionally 2000 mm or more, optionally 3000 mm or more, optionally 4000 mm or more.

The distance may also be 5000 mm or less, optionally 3000 mm or less, optionally 2000 mm or less, optionally 1500 mm or less, optionally 1000 mm or less, optionally 800 mm or less, optionally 500 mm or less.

In some embodiments, d1 and d2, respectively, is 80 mm or more, optionally is 90 mm or more, optionally is 100 mm or more, optionally is 120 mm or more, optionally is 150 mm or more, optionally is 200 mm or more, optionally is 220 mm or more, optionally is 250 mm or more, optionally is 300 mm or more, optionally is 320 mm or more, optionally is 350 mm or more, optionally is 400 mm or more, optionally is 420 mm or more, optionally is 450 mm or more, and/or is 1000 mm or less, optionally is 700 mm or less, optionally is 500 mm or less, optionally is 300 mm or less, optionally is 200 mm or less, optionally is 100 mm or less.

A glass tube having respective diameters turned out being advantageous for a highly uniform outer diameter.

In some embodiments, the first axial position and the second axial position are each at a distance of at least 5%, optionally of at least 10%, optionally of at least 20%, optionally of at least 30%, of the length of the glass tube from the two ends of the tube.

In some embodiments, the glass tube has a length of at least 0.50 m, at least 1.00 m, at least 1.5 m, at least 2.00 m, at least 2.5 m, at least 3.00 m, at least 3.5 m or about 1.5 m.

The glass tube may also have a length of at least 0.1 m, optionally of at least 0.3 m, optionally of at least 0.7 m, optionally of at least 1.3 m, optionally of at least 1.7 m, optionally of at least 2.3 m, optionally of at least 2.7 m, optionally of at least 3.3 m, optionally of at least 3.7 m.

The glass tube may also have a length of 7 m or less, optionally of 5 m or less, optionally of 3 m or less.

Optionally, the length of the glass tube is measured along the center axis of the glass tube, such as from one end to the other end of the glass tube.

In some embodiments, the glass tube has at every position a wall thickness which is between 0.3 mm and 20 mm, optionally between 1 mm and 15 mm, optionally between 2 mm and 15 mm, optionally between 2 mm and 10 mm.

The glass tube may have different wall thicknesses at different positions. However, each wall thickness optionally is within the proposed range.

In some embodiments, the glass has the following Volger-Fuclher-Tamman (VFT) constants: A ranging from −5.0 to 0.0; B ranging from 4000 to 12000 and $T_0$ ranging from 1° C. to 250° C.

Typically, the Vogel-Fulcher-Tammann (VFT) equation is used to calculate the temperature needed to achieve a certain viscosity of a glass (see DIN ISO 7884-2:1998-2):

$$\lg\eta = A + \frac{B}{T - T_0}$$

In the VFT equation, $\eta$ is the viscosity, A and B are temperature independent parameters of the material, T is the temperature and $T_0$ is the Vogel temperature. A, B and $T_0$ are constant for any specific glass.

For example, A ranges from −3.0 to −1.0; B ranges from 4000 to 9000 and/or $T_0$ ranges from 200° C. to 250° C.

In some embodiments, the glass of the glass tube may have a value B of at least 4000, at least 4500 or at least 5000. Optionally, the B value may be up to 12000, up to 10000 or up to 9000. $T_0$ may be at least 1° C., at least 10° C., at least 70° C. or at least 200° C. In some embodiments, $T_0$ ranges up to 250° C., or up to 230° C. A may be less than 0, such as less than −0.5 or less than −1.0. In some embodiments, A is at least −5.0, at least −4.0 or at least −3.5. Optionally, A may reach from −5.0 to 0.0 or from −4.0 to 0.0.

For the glass of the glass tube, $T_g$ may be in the range of from 525° C. to 600° C.

In some embodiments, the glass of the glass tube is a borosilicate glass.

In some embodiments, the glass of the glass tube comprises the following components in weight percent (wt.-%):

| | |
|---|---|
| $SiO_2$ | 50-90 |
| $B_2O_3$ | 0-20 |
| $Al_2O_3$ | >0-18 |
| $Na_2O$ | 0-15 |
| $K_2O$ | 0-5 |
| $Li_2O$ | 0-2 |
| CaO | 0-15 |
| BaO | 0-6 |
| $ZrO_2$ | 0-5 |
| $TiO_2$ | 0-5 |
| $Fe_2O_3$ | 0-3. |

The choice of glass components influences the temperature dependence of glass viscosity. For example, addition of certain amounts of $SiO_2$ will decrease the value for A, and increase the B value and $T_0$ in the VFT equation. The following table summarizes the influence of glass components on the VFT constants, wherein "+" refers to an increasing effect, "++" means that the respective constant is increased strongly, "−" refers to a decreasing effect, "−−" means that the respective constant is strongly decreased by an increased amount of the respective glass component.

| | A | B | $T_0$ |
|---|---|---|---|
| $Na_2O$ | ++ | − | − |
| $K_2O$ | − | − | −− |
| CaO | −− | − | ++ |
| MgO | − | ++ | −− |
| $Al_2O_3$ | ++ | + | ++ |
| $SiO_2$ | − | ++ | ++ |

The glass may comprise $SiO_2$ in a proportion of at least 50% by weight, optionally at least 55% by weight, optionally at least 60% by weight, and optionally at least 65% by weight based on the total amount of glass. $SiO_2$ is an important network former in the glass matrix which influences the glass properties. In particular, $SiO_2$ is especially important for the chemical resistance of the glass. The content of $SiO_2$ in the glass may be at most 90% by weight, optionally at most 85% by weight, and optionally at most 80% by weight based on the total amount of glass. Too high contents of $SiO_2$ may result in a strong increase of the softening point of the glass.

Besides $SiO_2$ the glass may also comprise at least one second network former. The glass may contain $B_2O_3$ as an additional network former which is contained in a proportion of at least 3% by weight, optionally at least 4% by weight and optionally at least 6% by weight, based on the total amount of glass. Through its network forming properties $B_2O_3$ essentially supports the stability of the glass. In the case of too low contents of $B_2O_3$ the required stability in the borosilicate glass system cannot be guaranteed. Nevertheless, the content of $B_2O_3$ in the glass is at most 20% by weight, optionally at most 15% by weight and optionally at most 12% by weight, based on the total amount of glass. In the case of too high contents of $B_2O_3$ in the glass the viscosity may be reduced strongly so that a reduction of the crystallization stability has to be accepted.

Further, the borosilicate glass may comprise aluminum oxide. The addition of aluminum oxide serves to improve glass forming and generally supports chemical resistance. The proportion of aluminum oxide in the glass may be at most 12% by weight, optionally at most 9% by weight and optionally at most 7% by weight, based on the total amount of glass. However, too high contents of aluminum oxide result in an increased tendency to crystallization. Optionally, the amount of aluminum oxide in the glass is at least 1% by weight, optionally at least 2.5% by weight and optionally at least 4% by weight, based on the total amount of glass.

The glass may comprise alkali metal oxides in a proportion of at least 3% by weight, optionally at least 5% by weight and optionally at least 6% by weight, based on the total amount of glass. $Na_2O$ and $K_2O$ may both be contained in the glass.

Alkali metal oxides improve the meltability of the glass and thus allow an economic production. During the production of the glass they serve as fluxing agents. The sum of the alkali metal oxides in the glass should not exceed the value of 20% by weight, optionally 13% by weight and optionally 10% by weight. If the contents of alkali metal oxides are too high the weathering resistance of the glass may be compromised and thus the range of applications thereof may strongly be limited.

Optionally, a ratio $RO/R_2O$ of the total weight amount of alkaline earth metal oxides (e.g. CaO, BaO, SrO and MgO) relative to the total weight amount of alkali metal oxides (e.g. $Na_2O$, $K_2O$, $Li_2O$) is at least 0.10, at least 0.15 or at least 0.20. A minimum value for this ratio helps achieve a good hydrolytic resistance without compromising the viscosity profile of the glass.

The proportion of $Na_2O$ in the glass may be at least 3% by weight, optionally at least 5% by weight, and optionally at least 6% by weight, based on the total amount of glass. However, the proportion of $Na_2O$ in the glass may be limited to at most 15% by weight, optionally at most 10% by weight, and optionally at most 8% by weight, based on the total amount of glass.

The proportion of $K_2O$ in the glass may be at most 5% by weight, optionally at most 3% by weight each, and optionally 2% by weight, based on the total amount of glass.

The borosilicate glass may also contain additives besides the above-mentioned components. These additives may, for example, be alkaline earth metal oxides (e.g. BaO, CaO) which may be added to the glass to manipulate the flowing and melting properties or the chemical resistance of the glass. In addition or alternatively, the glass may contain oxides of d group metals, such as iron oxides (FeO, $Fe_2O_3$, or $Fe_3O_4$). Iron oxides are common impurities of the main components of the glass, in particular impurities of the sand.

The proportion of BaO in the glass may be at most 6% by weight, optionally at most 4% by weight each, and optionally 3% by weight, based on the total amount of glass.

The proportion of CaO in the glass may be at most 5% by weight, optionally at most 3% by weight each, and optionally 2% by weight, based on the total amount of glass.

The proportions of $Fe_2O_3$ in the glass may be at most 3% by weight, optionally at most 2% by weight each, and optionally 1.5% by weight, based on the total amount of glass.

The glass compositions may also comprise titanium dioxide. The content of $TiO_2$ in the glass is at most 10% by weight, optionally at most 8% by weight and optionally at most 6% by weight, based on the total amount of glass. Very high contents of $TiO_2$ may result in undesirable crystallization of the glass.

In some embodiments, the glass may comprise in weight percentages:

| | |
|---|---|
| $SiO_2$ | 65-83 |
| $B_2O_3$ | 0-15 |
| $Al_2O_3$ | 1-13 |
| $Na_2O$ | 3-13 |
| $K_2O$ | 0-3 |
| $Li_2O$ | 0-0.1 |
| CaO | 0-8 |
| BaO | 0-4.5 |
| $ZrO_2$ | 0-0.1 |
| $TiO_2$ | 0-1 |
| $Fe_2O_3$ | 0-3. |

Referring now to the drawings, FIG. 1 shows a schematic cross-sectional view of an exemplary embodiment of a device 1 provided according to the invention.

The device 1 comprises a melt feeder 3 with an outlet opening 5 for discharging a glass melt 7 which is held by the melt feeder 3 and a shaping mandrel 9 having a shaft 11 and a shaping body 13.

The shaft 11 extends through the outlet opening 5 thereby forming an outlet ring 15 between the shaft 11 and a circumferential edge 17 of the outlet opening 5. Hence, the glass melt 7 can flow from the melt feeder 3 through the outlet ring 15 and over the shaping body 13 thereby forming a hollow glass drawing strand 19.

The shaping body 13 has a first part 21 extending from a lower end of the shaft 11 in axial direction R along a length X and having a conical outer surface. The shaping body 13 has also a second part 23 extending from a lower end of the first part 21 in axial direction R along a length Y and having a cylindrical outer surface with an outer diameter Z.

The ratio X/Z is between 0.1 and 0.5 and the ratio Y/Z is between 0.02 and 0.35.

The first and second parts 21, 23 are made in one piece. Since the shaft 11 and the shaping body 13 all are hollow, process air can be flow through the shaping mandrel 9 from top to bottom in FIG. 1. The glass drawing strand 19 is drawn off the shaping body 13 by means of a drawing device along a main drawing direction which is parallel to direction R. Actually, direction R is parallel to gravity as well when the device 1 is in use. The glass drawing strand 19 leaves the second part at the break-off edge 25.

Figures 2, 3A:
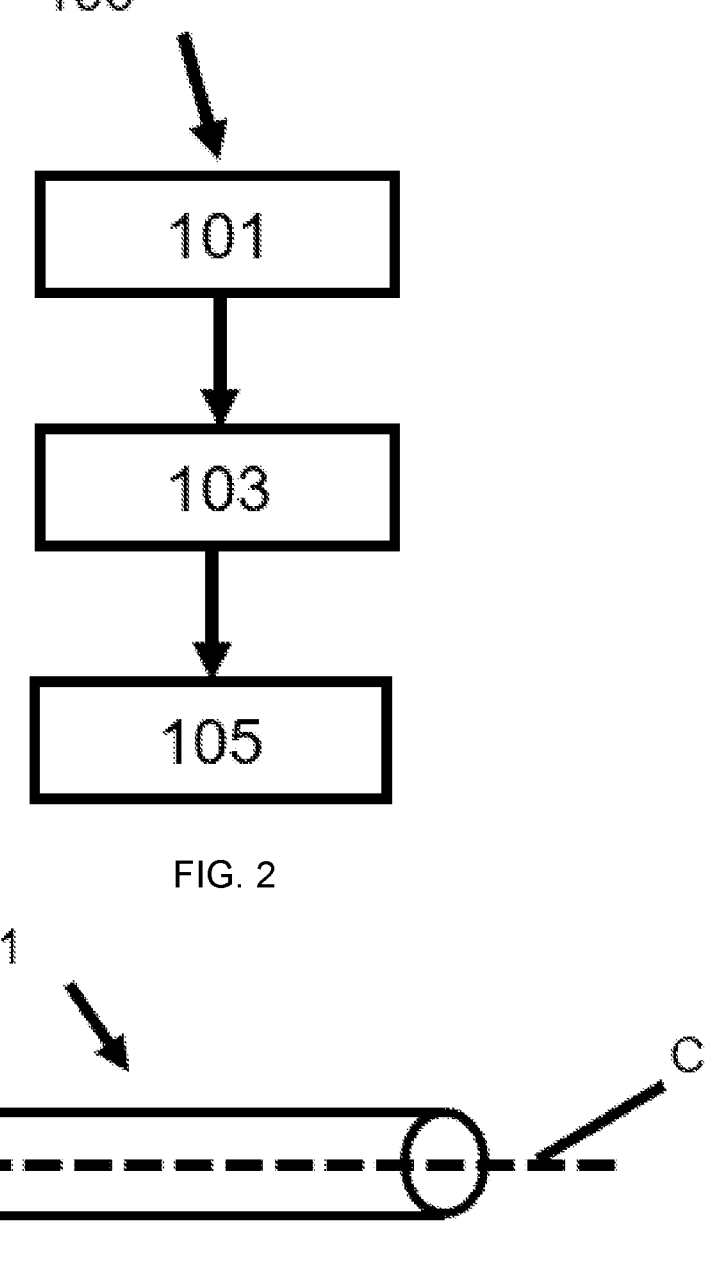
FIG. 2 illustrates a flow chart of an exemplary embodiment of a method provided according to the invention.
FIG. 3A illustrates a schematic of an exemplary embodiment of a glass tube provided according to the invention.

FIG. 2 shows a flow chart of an exemplary embodiment of a method 100 provided according to the invention. For carrying out the method, a device provided according to the invention, such as device 1 which has been described previously with respect to FIG. 1, might be used.

Accordingly, in 101 a respective device 1 is provided. In 103 the glass melt 7 flows from the melt feeder 3, through the outlet opening 5 of the melt feeder 3 and over a shaping body 13 along the main drawing direction R thereby forming a hollow glass drawing strand 19. In 105 once the glass drawing strand has reached a predefined length a tube section of predefined length is cut off from the glass drawing strand 19.

This tube section is optionally a glass tube provided according to the invention, particularly as described below.

Figure 3B:
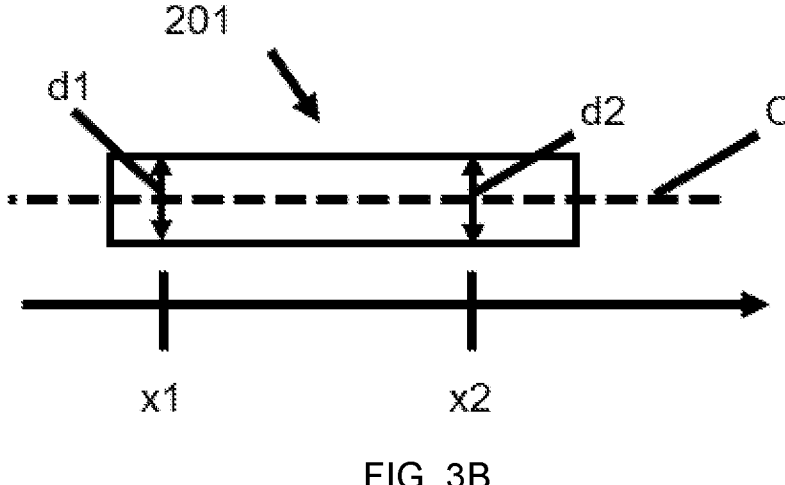
FIG. 3B illustrates a cut view of the glass tube of FIG. 3A within a specific cross-sectional plane.

FIG. 3A shows a glass tube 201 having a center axis C according to the invention. FIG. 3B shows a cut view of the glass tube 201 within a specific cross-sectional plane which comprises the center axis C and which is parallel to the center axis C, i.e. the drawing plane of FIG. 3B is the specific cross-sectional plane.

Within the specific cross-sectional plane (see FIG. 3B), for each pair of outer diameters d1 and d2 of the glass tube 201 at any two arbitrarily selected first and second axial positions x1 and x2 along the center axis C, the distance between x1 and x2 along the center axis C is 400 mm or more, the following relation is 60 or smaller:

$$|(d2-d1)/(x2-x1)|*(10^6 mm)/d1$$

Of course, in FIG. 3B only one pair of outer diameters d1 and d2 are shown. However, the relation is held for every pair of outer diameters d1 and d2 which are chosen accordingly. In FIG. 3B, the positions x1 and x2 are indicated on a coordinate axis which is parallel to the center axis C for illustration purposes only.

Figure 4A:
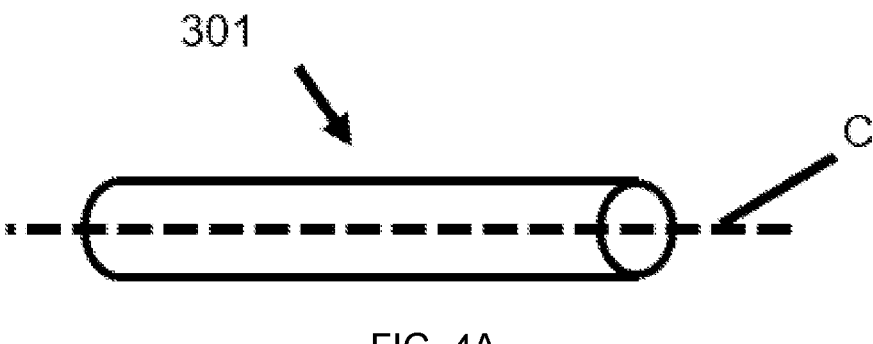
FIG. 4A illustrates a schematic of an exemplary embodiment of a glass tube provided according to the invention.
Figure 4B:
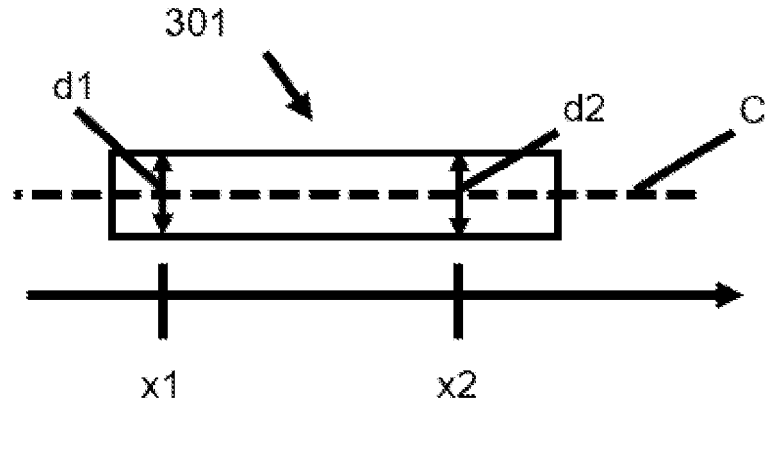
FIG. 4B illustrates a cut view of the glass tube of FIG. 4A within a specific cross-sectional plane.

FIG. 4A shows a glass tube 301 having a center axis C according to the invention. FIG. 4B shows a cut view of the glass tube 301 within a specific cross-sectional plane which comprises the center axis C and which is parallel to the center axis C, i.e. the drawing plane of FIG. 4B is the specific cross-sectional plane.

Within the specific cross-sectional plane (see FIG. 4B), for each pair of outer diameters d1 and d2 of the glass tube 301 at any two arbitrarily selected axial positions x1 and x2 along the center axis C, the distance between x1 and x2 along the center axis C is 400 mm or more, the relative change of the outer diameter, $$\left|\frac{d2-d1}{d2}\right|,$$

especially with d2>d1, is 0.035 or less.

Of course, in FIG. 4B only one pair of outer diameters d1 and d2 is shown. However, the stated relative change of the outer diameter is held for every pair of outer diameters d1 and d2 which are chosen accordingly. In FIG. 4B, the positions x1 and x2 are indicated on a coordinate axis which is parallel to the center axis C for illustration purposes only.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

| List of reference numerals | |
| --- | --- |
| 1 | Device |
| 3 | Melt feeder |
| 5 | Outlet opening |
| 7 | Glass melt |
| 9 | Shaping mandrel |
| 11 | Shaft |
| 13 | Shaping body |
| 15 | Outlet ring |
| 17 | Edge |
| 19 | Glass drawing strand |
| 21 | First part |
| 23 | Second part |
| 25 | Break-off edge |
| 100 | Flow chart |
| 101 | Providing a device |
| 103 | Flowing glass melt from melt feeder over shaping body thereby forming glass drawing strand |
| 105 | Cutting off a tube section from the glass drawing strand |
| 201 | Glass tube |
| 301 | Glass tube |
| C | Center axis |
| d1, d2 | Outer diameter |
| R | Direction |
| X | Length |
| x1, x2 | Axial position |
| Y | Length |
| Z | Outer Diameter |

What is claimed is:

1. A glass tube having a center axis, wherein for the glass tube a specific cross-sectional plane is defined which comprises the center axis and which is parallel to the center axis, wherein, within the specific cross-sectional plane, for each pair of outer diameters d1 and d2 of the glass tube at any two arbitrarily selected first axial position x1 and second axial position x2 along the center axis, respectively, the following relation is 60 or smaller:

$$|(d2-d1)/(x2-x1)|*(10^6mm)/d1.$$

2. The glass tube of claim 1, wherein at least one of the following is satisfied:
   (i) a relative change of the outer diameter multiplied with a length of the tube is 50 or less;
   (ii) a ratio d1/d2 multiplied with a length of the tube is 1400 or greater;

(iii) a relative change of the outer diameter multiplied with the length and the outer diameter d1, respectively, of the tube is 14000 or less; or
   (iv) the ratio d1/d2 multiplied with the length and the diameter d1, respectively, of the tube is 800000 or greater.

3. The glass tube of claim 1, wherein a distance between x1 and x2 along the center axis is (i) half of the total length of the glass tube or less or (ii) 400 mm or more.

4. The glass tube of claim 1, wherein d1 and d2 are each 80 mm or more.

5. The glass tube of claim 1, wherein the first axial position and the second axial position are each at a distance of at least 5% of a length of the glass tube from a respective end of the glass tube.

6. The glass tube of claim 1, wherein the glass tube has a length of at least 0.50 m.

7. The glass tube of claim 1, wherein the glass tube has at every position a wall thickness which is between 0.3 mm and 20 mm.

8. The glass tube of claim 1, wherein the outer diameter d1 and the outer diameter d2 are each greater than 100 mm.

9. The glass tube of claim 1, wherein at least one of the following is satisfied:
   the relation is 50 or smaller;
   the relation multiplied with a length of the tube is 90000 or smaller; or
   the relation multiplied with the length and the outer diameter d1, respectively, of the tube is 40000000 or smaller.

10. The glass tube of claim 9, wherein at least one of the following is satisfied:
   the relation is 20 or smaller; or
   the relation multiplied with the length and the outer diameter d1, respectively, of the tube is 10000000 or smaller.

11. A glass tube having a center axis, wherein for the glass tube a specific cross-sectional plane is defined which comprises the center axis and which is parallel to the center axis, wherein, within the specific cross-sectional plane, for each pair of outer diameters d1 and d2 of the glass tube at any two arbitrarily selected axial positions x1 and x2 along the center axis, at least one of the following is satisfied:
   (i) a relative change of the outer diameter, $$\left|\frac{d2-d1}{d2}\right|,$$

with d2>d1, is 0.035 or less; or
   (ii) a ratio d1/d2, with d2≥d1, is 0.95 or greater.

12. The glass tube of claim 10, wherein at least one of the following is satisfied:
   (i) the relative change of the outer diameter, $$\left|\frac{d2-d1}{d2}\right|$$

is 0.025 or less; or
   (ii) the ratio d1/d2 is 0.99 or greater.

13. The glass tube of claim 10, wherein at least one of the following is satisfied:
   a relative change of the outer diameter multiplied with a length of the tube is 50 or less;

a ratio d1/d2 multiplied with a length of the tube is 1400 or greater;

a relative change of the outer diameter multiplied with the length and the outer diameter d1, respectively, of the tube is 14000 or less; or the ratio d1/d2 multiplied with the length and the diameter d1, respectively, of the tube is 800000 or greater.

14. The glass tube of claim 11, wherein a distance between x1 and x2 along the center axis is (i) half of the total length of the glass tube or less or (ii) 400 mm or more.

15. The glass tube of claim 11, wherein d1 and d2 are each 80 mm or more.

16. The glass tube of claim 11, wherein the axial positions x1 and x2 are each at a distance of at least 5% of a length of the glass tube from a respective end of the tube.

17. The glass tube of claim 11, wherein the glass tube has a length of at least 0.50 m.

18. The glass tube of claim 11, wherein a glass of the glass tube has the following Vogel-Fulcher-Tamman (VFT) constants:

A ranging from −5.0 to 0.0;

B ranging from 4000 to 12000; and $T_0$ ranging from 1° C. to 250° C.

19. The glass tube of claim 11, wherein a glass of the glass tube is a borosilicate glass.

20. The glass tube of claim 11, wherein a glass of the glass tube comprises the following components in weight percent (wt.-%):

| | |
|---|---|
| $SiO_2$ | 50-90; |
| $B_2O_3$ | 0-20; |
| $Al_2O_3$ | >0-18; |
| $Na_2O$ | 0-15; |
| $K_2O$ | 0-5; |
| $Li_2O$ | 0-2; |
| CaO | 0-15; |
| BaO | 0-6; |
| $ZrO_2$ | 0-5; |
| $TiO_2$ | 0-5; and |
| $Fe_2O_3$ | 0-3. |

* * * * *